Patented Sept. 26, 1950

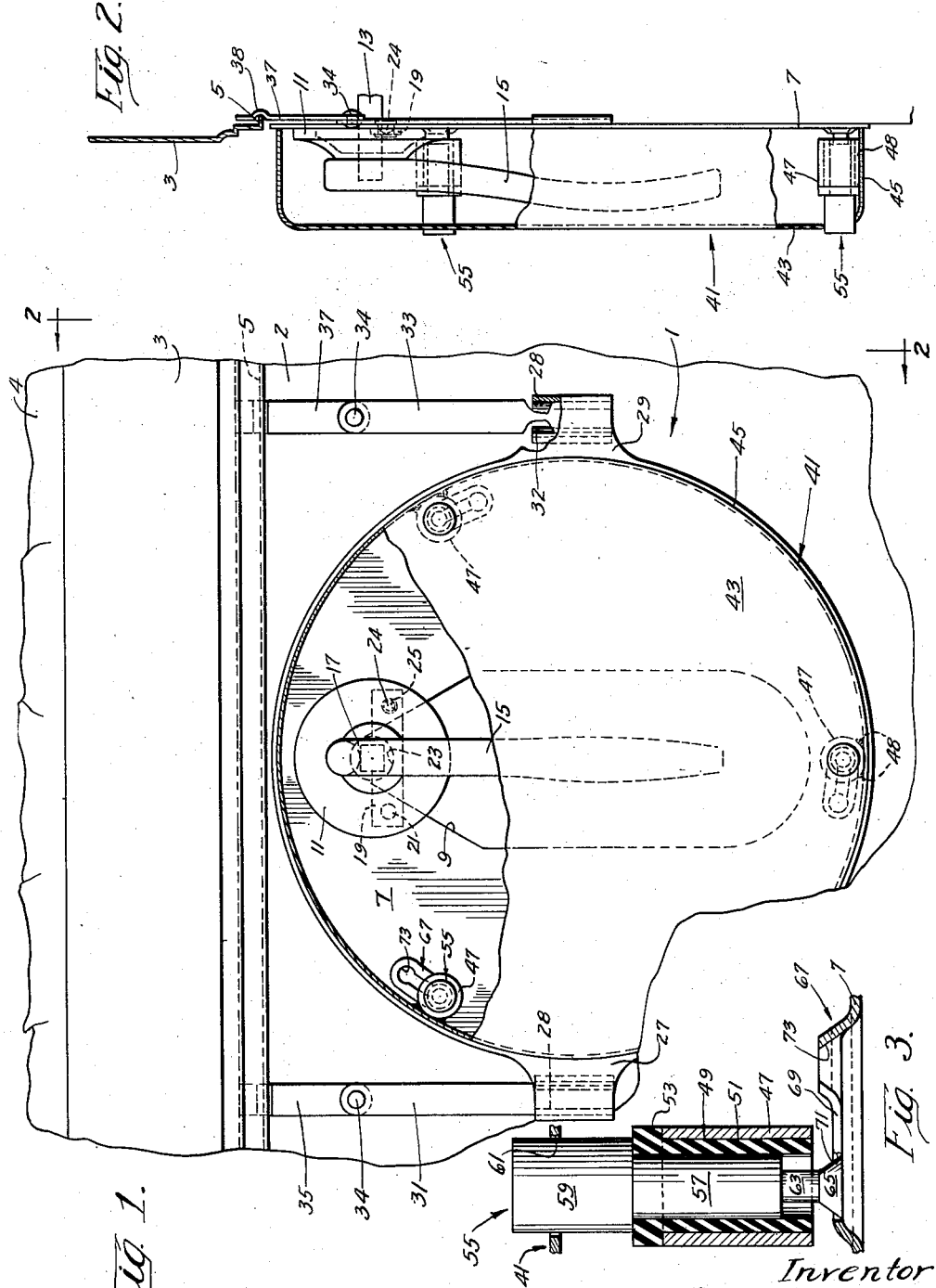

2,523,940

UNITED STATES PATENT OFFICE 2,523,940

SAFETY GUARD FOR AUTOMOBILE DOOR HANDLES

Frank E. Bronson, Elizabeth, N. J.

Application September 28, 1946, Serial No. 700,053

6 Claims. (Cl. 292—33)

My invention relates, generally, to a safety device, and more particularly to a safety guard for automobile door handles.

Whenever small children are passengers in a moving automobile, there is always the danger that they may fall from the car through an open door which may be opened accidentally, as by the child falling or brushing against the door handle, or may be opened intentionally by turning of the handle in curiosity or play. Some models of automobiles have doors which open in such a fashion that they will catch in the wind if the automobile is moving, with the result that a small child opening such a door will be jerked out of the car by the action of the wind on the door. Even when doors are so hinged as not to be drawn open by the wind, the child may fall out of the car and become seriously injured. This is quite possible, for example, when an automobile is being driven around a corner, since the child may be thrown outwardly by centrifugal force against a door handle.

Such dangers to children cannot be adequately guarded against merely by locking the car door, since some of the locking devices merely call for moving the door handle to a different position, which position, however, will still permit opening of the door by a deliberate movement of the handle, or by an accidental movement thereof. Where the lock of a door is operated by a button adjacent the window and at a distance from the door handle, it is still possible for a child to unlock the door unobserved and, subsequently, to cause opening of the door accidentally or otherwise.

There has, therefore, been a real need for a safety device which will prevent small children, as well as larger children and even adults, from opening a door when the car is in motion. It is an object of my invention to provide a safety guard for an automobile door handle which will prevent accidental operation of the handle by a child or adult, and it is a more particular object that such guard be so constructed that children will be unable to remove the guard and obtain access to the door handle, even when trying to do so. To this end, I have designed a locking means for the safety guard which must be operated by two hands, one of which hands must in the unlocking operation span a distance greater than a child's hand can reach, while the other hand simultaneously operates another portion of the locking means. The locking means is operable, however, by the hands of adults, because of their ability to reach and operate simultaneously the various locking elements.

It is another object of my invention that the safety guard be so shaped as to eliminate dangerous points, corners, or knobs which might injure a person who falls against the guard.

It is still another object of my invention that the safety guard obtain support from the door handle, or mechanisms connected therewith, and that it be so positioned and shaped as to be unobstrusive in appearance.

It is another object of the invention that the safety guard be of simple construction and few parts and applicable to automobiles of different makes, models and years, so that it may readily be applied by the car owner, himself, or others to older models of cars as well as new ones.

Other objects, uses and advantages of my invention will become apparent from the following written description when taken with the related drawings in which:

Figure 1 is an elevational view of the safety guard for an automobile door handle, with the cover and backing plate partially broken away to show the internal structure;

Figure 2 is a side elevation looking in the direction of the arrows 2—2 of Figure 1, with the cover partially broken away to reveal internal structure;

Figure 3 is an enlarged fragmentary view showing portions of the locking mechanism in unlocked position.

Like reference numerals have been employed in the several views to indicate the same elements.

Referring now to the drawings, reference numeral 1 indicates, generally, the safety guard embodying my invention, the numeral 2 the door against which it is secured, and the numeral 3 the molding adjacent the window 4 of the door. The moldings of different automobile manufacturers vary, but they generally include at their lower edge an inturned portion or flange 5, as may be most easily seen in Figure 2. A back plate 7 has an elongated opening 9 which is wider than the usual pedestal or ornate washer 11 which surrounds the shaft 13, which, in turn, is connected to the latching mechanism (not shown) for the door. At its other end, the shaft 13 is squared and fits within a corresponding socket in the door handle 15. Various means may be employed for securing the door handle 15 to the shaft 13, but such constructions form no part of my invention. The slot 9 tapers to a rounded corner 17 at its upper end and the plate 7 rests upon the shaft 13 behind the washer 11. A latch 19 is secured by a rivet 21 to the backing plate 7 and is adapted to be swung into the position shown in Figure 1, wherein an arcuate slot 23 at its mid-portion fits beneath the shaft 13. The latch prevents the backing plate from being unintentionally moved upwardly and the latch 19 is maintained in that position by reason of the aperture 25 at its other end being slipped over and around a low projection 24 struck up from the plate 7.

On diametrically opposite sides of the plate 7 are ears 27 and 29, said ears each having an edge 28 backwardly turned and folded to provide a slot into which one edge of the supporting straps 31 or 33, respectively, may be slid and welded. A supplementary flange 32 secured to the back of each ear provides a slot which the other edges of straps 31 and 33 fit into. At their upper ends, the straps 31 and 33 are connected by rivets 34 to short support members 35 and 37, which have at their upper ends an arcuate deformation 38 which is adapted to engage the flange 5 of the molding 3. The length of the supporting straps 31 and 33 will vary depending upon the make of automobile on which the safety guard is to be placed. By this arrangement, the safety guard finds universal applicability and may be conveniently stocked by retail stores and wholesale distributors for all makes of automobiles. The only elements that need to be varied are the straps 31 and 33, and the dealer may be supplied with the various sizes needed. Alternatively, the dealer may be supplied with straps sufficiently long to make the guard usable on any door, the straps then being cut down to fit the purchaser's door and being welded, or otherwise secured to the ears 27 and 29.

A cover, indicated generally by the reference numeral 41, has an outside diameter slightly smaller than that of the backing plate 7, and has a top 43 and a circular flange or side wall 45. The cover 41 is adapted to enclose the door handle 15 and prevent all access thereto. On the inside of the cover 41 there are positioned three parallel equidistantly spaced tubular guides or sleeves 47 which are welded, as at 48, to the inner surface of the side wall 45. A rubber spring, indicated generally by the reference numeral 49 and comprising a tubular portion 51 and and integral flange 53 (see Figure 3), is held within each guide 47 by a friction fit, said fit resulting from the outside diameter of the tubular portion 51 being somewhat greater than the inside diameter of the guide 47. A plunger, indicated generally by the reference numeral 55, has a cylindrical shaft 57 which fits within the tubular portion 51 of a spring 49 and has its outer enlarged end 59 seated on flange 53 and extending through an aperture 61 in the cover 41. At its other end, each plunger 55 has a shank 63 of a diameter smaller than the shaft 57, and integrally formed with such shank is a head 65 having the shape of a truncated cone and a maximum diameter exceeding the diameter of shank 63. It will be appreciated that the plunger 55 may be formed of one or more parts connected together. When the upper end 59 of a plunger 55 is pushed downwardly, it will be resisted by the flange 53 of the rubber spring 49 which will yield while pressure is applied, but which will tend to return the plunger 55 to its original position as soon as the pressure thereon is released. The tubular portion 51 of each spring 49 will also resiliently resist downward pressure of the plunger 55 because of the frictional fit between said portion and shaft 57.

Three equidistantly spaced portions, each indicated generally by the reference numeral 67, are struck up from the backing plate 7. Each of these struck-up portions 67 has a curved slot 69 which connects at one end with a circular aperture 71 having a diameter slightly greater than the diameter of the head 65, and which connects at the other end with a raised locking seat 73 having a shape corresponding to that of the head 65, said seat lying closer to the cover 41 than the plane of the slot 69. The struck-up portions 67 and the plungers 55 are radially positioned on the plate 7 and cover 41, respectively, in such a manner as to permit their interengagement when they are properly aligned with each other.

Assuming that the owner of an automobile has purchased a safety guard embodying my invention and desires to fasten the same on an automobile door, he will first release the handle 15 from the shaft 13, partially or entirely, so as to permit the washer 11 to be moved outwardly from the inner surface of the door 2. The backing plate 7 may then be passed over the washer 11 and handle 15 by means of the slot 9, and will then be permitted to hang by its rounded corner 17 upon the shaft 13 so that the backing plate is supported thereon. If the washer 11 has a diameter greater than the width of the slot 9, it is then only necessary to remove the handle and disk temporarily and then place the backing plate upon the shaft 13. After the backing plate is suspended from the shaft 13, the latch 19 will be swung upwardly until the aperture 25 engages the protuberance 24 on the plate 7. The washer 11 will then be replaced and the handle 15 will be secured to shaft 13. Supporting the backing plate in this fashion will not, however, prevent rotation thereof about the shaft 13 as a center, so the supporting straps 31 and 33 welded, or otherwise secured, to the ears 27 and 29 of the backing plate 7 and the supporting members 35 and 37 serve to prevent rotation of the backing plate by reason of their connection with the molding 3 of the door 2. The molding employed by each automobile manufacturer is generally secured in place by screws and may be loosened by removal or loosening of the screws, whereupon the arcuate ends of the support members 35 and 37 may be positioned about the flange 5 on the molding. Then when the molding is secured in place again by the screws, the backing plate is prevented from being rotated about the shaft 13, or otherwise being moved with respect to it.

If the plungers 55 and springs 49 come disassembled from the guides 47, the purchaser will first insert the rubber springs 49 within the guides 47 and will then press the plungers 55 through their respective springs 49 until the outer enlarged ends 59 of said plungers are brought into abutment with the flanges 53 of said springs. At this time, the outer ends 59 will extend a short distance through the apertures 61 in the cover 41.

At this time, the safety guard is ready for use, and the cover 41 may be placed over the handle so that children may not be able to gain access to the handle when riding in the car. To secure the cover in place, the user will place it against the backing plate with the heads 65 of the plungers 55 positioned in the apertures 71 of the struck-up portions 67 of the backing plate 7. Then with the thumb and one finger of one hand and with a finger of another hand, the operator will depress all three of the plungers 55 against the action of their springs 49 until the heads 65 of the plungers 55 are positioned in a plane beyond the curved slots 69 in the struck-up portions 67. The cover will then be turned counter-clockwise as far as possible, the shanks 63 passing through slots 69, and the plungers will thereafter be released. At this moment, the springs 49 will urge the plungers outwardly with respect to the cover 41 and will position the heads 65 of the plungers 55 in the locking seats 73 of the struck-up portions 67. When so positioned, it will be impossible for the cover to be rotated in any direction until all three of the plungers are simultaneously depressed again. Since the distance between any two of the plungers is greater than the distance which a child may reach with any thumb and finger of one hand, it will be impossible for children to simultaneously depress the three plungers in order to unlock the cover from the backing plate. In this way, I provide a safety guard which cannot be unlocked by a child, and yet which is quickly operated by an adult.

It will be seen that other forms of compression springs may be employed in place of springs 49 and that the side wall 45 of the cover 41 could be replaced by a similar wall or flange on the backing plate 7. Consequently, although I have illustrated a preferred embodiment of my invention, I do not intend to be limited thereto, except insofar as the claims are so limited, since certain changes may be made therein without departing from the scope of the invention, as defined in the following claims.

I claim:

1. Locking means for securing a cover member to a backing member which is adapted to be held in fixed position, said locking means comprising three spaced apart plungers carried by the cover member adjacent its periphery and equi-distant from each other, spring means urging the plungers outwardly with respect to the cover member, slots formed in said backing member, heads formed on said plungers, head receiving seats connected with, but out of the plane of, said slots, said heads being releasable from said seats by simultaneous movement of the plungers against the spring means followed by rotation of the cover.

2. Locking means for securing a cover member to a backing member which is adapted to be held in fixed position, said locking means comprising three spaced apart plungers carried by the cover member adjacent its periphery and equi-distant from each other, the distance between any two plungers being greater than the distance between the thumb and any finger of a child's hand, spring means urging the plungers outwardly with respect to the cover member, slots formed in said backing member, heads formed on said plungers, head receiving seats connected with, but out of the plane of, said slots, said heads being releasable from said seats by simultaneous movement of the plungers against the spring means followed by rotation of the cover.

3. Locking means for securing a cover over an inside door handle of an automobile, which handle has a shaft adapted to manipulate the latching device of the door, said locking means comprising a backing plate adapted to be supported by the shaft of the door handle, means for securing said plate against rotation about said shaft, three locking plungers supported by the cover and spaced from each other a distance greater than the distance between the thumb and any finger of a child's hand, said plungers having outer ends protruding through said cover and inner ends each carrying a pin having a shank and an enlarged head, slots in said backing plate adapted to permit lateral movement of the shank of the pin therein, each slot being enlarged at one end to permit axial movement of the head of a pin therethrough, a seat connected with the other end of each slot but lying in a plane closer to the cover than the plane of the slot, each seat being adapted to receive the head of one of said pins, individual spring means urging each of the plungers outwardly with respect to said cover so as to yieldingly seat the heads of the pins in said seats, said cover being disengageable from the backing plate to uncover the handle by simultaneous movement of said plungers against the spring means followed by rotation of said cover.

4. Locking means for securing a cover about an inside handle for an automobile door which has an adjacent molding, said handle having a rotatable shaft which controls the latching device for the door, said locking means comprising a flat backing plate adapted to be supported by the shaft of the door handle and positioned against the inner side of the door, a pair of straps adapted to be gripped beneath the molding by their one ends and having their opposite ends secured to opposite sides of the plate to prevent its rotation about said shaft, a plurality of plungers carried by the cover member, spring means urging the plungers outwardly with respect to the cover, and engaging means carried by each of the plungers, and detent means carried by the backing member and adapted to interengage with said engaging means, when the plungers are actuated inwardly toward the backing member against the urging of their springs and the cover is rotated to a position where the engaging means is associated with the detent means and the plungers are released, to hold the cover in locked position with said backing member, said cover being releasable from said backing member by simultaneous movement of said plungers against said spring means followed by rotation of said cover.

5. A safety guard for locking a cover about an inside handle for an automobile door which has an adjacent molding, which handle has a rotatable shaft which controls the latching device for the door, said guard comprising a flat backing plate having an aperture which is adapted to fit about the shaft of the door handle so that the plate may be supported by the shaft of the door handle and be positioned against the inner side of the door, a pair of straps adapted to be gripped beneath the molding by their one ends and having their opposite ends secured to opposite sides of the plate to prevent its rotation about said shaft, three locking plungers supported by the cover and spaced from each other a distance greater than the distance between the thumb and any finger of a child's hand, said plungers having outer ends protruding through said cover and inner ends comprising a reduced shank and an enlarged head, curved slots in said backing plate adapted to permit lateral movement of the shanks of the plungers therein, each slot being enlarged at one end to permit axial movement of the head of a plunger therethrough, a locking seat connected with the other end of each slot but lying in a plane closer to the cover than the plane of the slot, each seat being adapted to receive the head of a plunger, a tubular guide carried by the cover for each plunger, a spring for each plunger comprising a rubber tubular member having a frictional fit within a guide and a flanged end compressible by the outer end of the plunger, said springs urging the plungers outwardly with respect to said cover so as to seat the heads of the plungers in said locking seats, said cover being disengageable from the backing plate to uncover the handle by simultaneous movement of said plungers against said spring means followed by rotation of said cover.

6. Locking means for securing a cover member to a backing member which is adapted to be held in fixed position, said locking means comprising plungers carried by the cover member, spring means urging the plungers outwardly with respect to the cover member, heads formed on said plungers, slots formed in said backing member, each of said slots being enlarged at one portion to permit axial movement of a plunger and its head therethrough, head receiving seats connected with, but out of the plane of, said slots, said heads being releasable from said seats by simultaneous movement of the plungers against the spring means followed by rotation of the cover and being releasable from said backing member by alignment with the enlarged portions of said slots.

FRANK E. BRONSON.

REFERENCES CITED

The following references are of record in the file of this patent:

UNITED STATES PATENTS

| Number | Name | Date |
| --- | --- | --- |
| 228,091 | Lowell | May 25, 1880 |
| 413,675 | Langenau | Oct. 29, 1889 |
| 1,149,981 | Joseph | Aug. 10, 1915 |
| 1,403,655 | Tirrill | Jan. 17, 1922 |
| 2,233,699 | Gorrell | Mar. 4, 1941 |
| 2,453,746 | Duvall | Nov. 16, 1948 |